United States Patent [19]
Friedman et al.

[11] Patent Number: 5,908,704
[45] Date of Patent: Jun. 1, 1999

[54] INTERLAYER FILM FOR PROTECTIVE GLAZING LAMINATES

[75] Inventors: Michael Friedman, Wayne; Louis Laucirica, Essex Fells; Glenn T. Visscher, Morris Plains, all of N.J.

[73] Assignee: Norton Performance Plastics Corporation, Wayne, N.J.

[21] Appl. No.: 08/886,030

[22] Filed: Jun. 30, 1997

[51] Int. Cl.$^6$ .................................................. B32B 9/00
[52] U.S. Cl. ........................ 428/426; 428/34; 428/34.4; 428/34.5; 428/38; 428/192; 428/203; 428/332; 428/392; 428/410; 428/412; 428/421; 428/442; 428/913; 525/199; 525/200; 525/276; 427/407.2; 156/199; 156/200; 156/276
[58] Field of Search ................................... 428/34.5, 267, 428/268, 457, 332, 421, 38, 426.6, 417, 392, 192, 34, 410, 426, 203, 442, 422, 412, 34.4, 913; 525/276, 200, 199; 156/230, 231, 107; 427/407.2

[56] References Cited

U.S. PATENT DOCUMENTS

| | | | |
|---|---|---|---|
| 3,132,123 | 5/1964 | Harris, Jr. et al. | 260/87.5 |
| 3,235,537 | 2/1966 | Albin et al. | 260/80.5 |
| 3,528,954 | 9/1970 | Carlson | 260/87.5 |
| 3,635,926 | 1/1972 | Gresham et al. | 260/87.5 |
| 3,642,742 | 2/1972 | Carlson | 260/87.5 |
| 3,920,878 | 11/1975 | Fariss et al. | 428/437 |
| 4,029,868 | 6/1977 | Carlson | 526/247 |
| 4,071,649 | 1/1978 | Jacquemin et al. | 428/215 |
| 4,190,698 | 2/1980 | De Boel et al. | 428/334 |
| 4,556,589 | 12/1985 | Neumann et al. | 428/35 |
| 4,556,600 | 12/1985 | Kraemlilng et al. | 428/216 |
| 4,564,662 | 1/1986 | Albin | 526/247 |
| 4,595,720 | 6/1986 | Stivers et al. | 524/100 |
| 4,681,810 | 7/1987 | Gomez | 428/429 |
| 4,762,891 | 8/1988 | Albin et al. | 525/276 |
| 4,855,360 | 8/1989 | Duchesne et al. | 525/187 |
| 4,952,460 | 8/1990 | Beckmann et al. | 428/429 |
| 4,978,405 | 12/1990 | Hickman | 156/107 |
| 4,983,464 | 1/1991 | Holzer et al. | 428/442 |
| 5,015,693 | 5/1991 | Duchesne et al. | 525/187 |
| 5,061,748 | 10/1991 | Bolton et al. | 524/827 |
| 5,124,208 | 6/1992 | Bolton et al. | 428/412 |
| 5,194,335 | 3/1993 | Effenberger et al. | 428/421 |
| 5,219,630 | 6/1993 | Hickman | 428/38 |
| 5,223,313 | 6/1993 | Holzer et al. | 428/34 |
| 5,230,954 | 7/1993 | Sakamoto et al. | 428/332 |
| 5,244,709 | 9/1993 | Vanderstukken | 428/99 |
| 5,316,608 | 5/1994 | Ocampo et al. | 156/230 |
| 5,496,640 | 3/1996 | Bolton et al. | 428/421 |
| 5,527,858 | 6/1996 | Blong et al. | 525/187 |

FOREIGN PATENT DOCUMENTS

| | | | |
|---|---|---|---|
| 389281 | 9/1990 | European Pat. Off. | B32B 17/06 |
| 2241197 | 8/1991 | United Kingdom . | |

OTHER PUBLICATIONS

A. Sakamoto, et al., *Thermal Characteristics of Plastic Interlayers For Laminated Fire–Proof Glazing*, Presented at Conference of the Disaster Prevention Society, May, 1997 (Partial Translation).

W. L. Dechent et al., *Transparent Composites Of Poly(Chlorotrifluoroethylene) Reinforced with Fluorophosphate Glass Fibers*, Material Research Center, Univ. of Missouri, pp. 26–27.

K. Nagai, THV Fluoroplastics: Newest Materials For Latest Applications, Kogyo Zairyo, vol. 44, No. 3, 1996, pp. 66–67 (Translation pp. 1–4).

THV Fluoroplastics Technical Data Sheets, 3M Corporation, 1995.

M Wada, *New Glass For Building Materials*, Nippon Electric Glass Co., Ltd., Dec. 1, 1993, pp. 4–5.

A. Sakamoto et al. *Transparent Glass–Ceramics For The Fireproof and Safety Glazing*, Nippon Electric Glass Co., Ltd., Dec. 1, 1993, pp. 2–3.

Fluoropolymer Technical Data Sheets, Hoechst Corporation, 1992.

R. A. Huyett, *Impact–Resistant Transparencies For Marine Service*, The American Society of Mechanical Engineers, 82–WA/OCE–4, pp. 1–8.

*Primary Examiner*—William Krynski
*Assistant Examiner*—Abraham Bahta
*Attorney, Agent, or Firm*—Mary E. Porter

[57] ABSTRACT

Optical and firescreening protective glazing laminates comprising fluoropolymer interlayer films are described. The films and their laminates comprise THV and blends of THV with FEP, ECTFE or ECCTFE, and modified with additives, such as coupling agents, pigment or color concentrates, and IR- or UV- light blockers, and may be subjected to a surface corona treatment. The films also may incorporate a fiber mesh for additional reinforcement.

17 Claims, No Drawings

INTERLAYER FILM FOR PROTECTIVE GLAZING LAMINATES

BACKGROUND OF THE INVENTION

Protective glazing is used in many interior and exterior building applications, including windows, glass partitions, doors, etc., for safety, impact resistance and fire resistance. Protective glazing usually is a laminated structure consisting of a sandwich of several sheets of glass or polymeric panels bonded together by means of an interlayer of a polymer film placed between the sheets or panels. One or more of the glass sheets may be replaced by optically clear rigid polymer sheets, such as sheets of polycarbonate polymer. The interlayer is made of a relatively thick polymer film exhibiting a toughness and bondability as will cause the glass to adhere to the interlayer in the event of its being cracked or crashed. Protective glazing made using current interlayer films (e.g., polyvinylbutyrate (PVB)), used in windows, doors and partitions, must be sealed from the atmosphere for it to possess any fire resistance which would prevent the cracking or shattering of the glass in the event of a fire. In order to prevent the spread of fire, fire resistant materials which include steel and other opaque materials, and intumescent materials have been incorporated in doors, windows, and partitions. However, these materials are heavy and do not yield the optical clarity necessary for the visually transparent glazing applications.

U.S. Pat. No. 5,244,709 describes a technique in which an intumescent material, typically a hydrated alkali metal silicate film, is laminated between two panels of vitreous glass of differing thicknesses. This technique requires that both the film and the vitreous glass be fairly thick (0.5–5.0 mm and 8.0–21.0 mm respectively) to give the necessary fire protection and that once the localized heat limit is reached for the film, whether by fire or other means, the material intumesces, thus rendering it useless as a optical laminate. In many cases, additives are incorporated to reduce the temperature at which intumescence occurs. These additives may, in addition to lowering the intumescence temperature, increase both the haze and the cost of the final material.

U.S. Pat. No. 4,978,405 describes a method of manufacturing fire resistant protective glazing by incorporating a wire mesh into a film of methacrylate resin and other additives, and laminating this combined film between glass panels. The addition of the wire mesh, while giving some increased safety features, will influence and most probably lower the optical quality of the final glass product. The addition of additives to the methacrylate resin to increase the fire resistance, will also serve to lower the light transmittance and mechanical properties, create unacceptable amounts of haze and raise the cost of the final product. In addition, incorporation of the wire mesh into the film creates an aesthetically undesirable effect and increases the weight and mass of the final firescreening glass panel, making the panels more difficult to manipulate.

In U.S. Pat. No. 4,681,810, a sophisticated formulation including a char forming organic phosphate and an oxygen sequestering organic phosphite is added to PVB to increase its fire resistance. The addition of a high load of additives to the costly PVB film increases the final cost of the material beyond a commercially acceptable point for many applications.

A laminate of fluorocarbon resin interlayer films between specially formulated glass panels is described in U.S. Pat. No. 5,230,954. Fluorocarbon resins: specifically fluorinated ethylene propylene copolymer (FEP); tetrafluoroethlyene perfluoroalkoxy ethylene copolymer (PFA); polychlorotrifluoroethylene (PCFE); ethylene tetrafluoroethylene copolymer (ETFE); and polyvinylidene fluoride (PVDF); are thermocompression bonded to glass at a pressure of 12 Kg/cm$^2$ at a temperature of 330° C. Due to the high temperatures and pressures required in this technique, specially formulated glass and a high temperature autoclave are required to alleviate the possibility of cracking and breaking of the glass during lamination.

Each of these prior art protective glazing laminates: a laminate of intumescent material between vitreous glass; a laminate of wire mesh between methacrylate resin/additive laden films and glass sheets; high loads of fire resistive additives in PVB film laminates; and laminates of fluorocarbon resins adhered at high temperatures and pressures onto specially formulated glass; possess significant disadvantages that are inherent in the construction and manufacture of the laminate.

It is an object of this invention to provide a fire resistant fluoropolymer interlayer film suitable for use in protective glazing laminates produced under standard industrial laminating temperatures and techniques. This film has excellent fire resistance and optical qualities and high mechanical strength. These films may be formulated to be transparent, semi-opaque, or opaque, depending on their particular application. The films may incorporate a fiber reinforcement layer to increase structural strength of the laminate.

SUMMARY OF THE INVENTION

The invention is a protective glazing laminate comprising at least two protective glazing layers, at least one fluoropolymer interlayer, the interlayer comprising at least 85 Wt. % of tetrafluoroethylene/hexafluoropropylene/vinylidene fluoride (THV) copolymer, and at least one reinforcement layer embedded in the fluoropolymer interlayer.

The invention also includes a method for manufacturing protective glazing laminates, comprising the steps:

a) exposing a fluoropolymer film comprising at least 85 weight % THV copolymer to a corona discharge treatment at 0.045 to 0.76 Watts/hour/square meter (0.15 to 2.5 Watts/hour/square foot) in an inert gas atmosphere comprising at least one organic compound in vapor phase;

b) providing at least two sheets of protective glazing; and c) laminating an interlayer of the fluoropolymer film to the sheets of protective glazing.

DETAILED DESCRIPTION OF THE PREFERRED EMBODIMENTS

The fluorocarbon film comprises at least 85 weight % of THV polymer: a thermoplastic elastomer terpolymer containing segments of tetrafluororethylene (ECTFE), hexafluoropropylene (HFP), and vinylidene fluoride (VDF). The THV polymers and various methods for manufacturing them are described in U.S. Pat. Nos. 3,235,537, 3,132,123, 3,635,926, 3,528,954, 3,642,742, and 4,029,868, the contents of which are hereby incorporated by reference. The THV polymers are block or graft copolymers consisting of an elastomeric soft segment (i.e., hexafluoropropylene and vinylidene fluoride) and a fluroplastic hard segment (i.e., tetrafluoroethylene). The preferred THV polymers are commercially available polymers comprising a molar ratio of ECTFE:HFP:VDF of about 42–60:20–18:38–22. Also useful herein are blends of THV with other fluoropolymers including, but not limited to, fluorinated ethylene-propylene copolymers (FEP), perfluoroalkoxy polymer (PFA), perchlorotetrafluoroethylene (PCFE), ethylenetetrafluoroethylene copolymer (ETFE), polyvinylidine fluoropolymer (PVDF), chloroethylene tetrafluoroethylene (ECTFE), and dichloroethylene tetrafluoroethylene (ECCTFE).

The laminates composed of blends of THV with other fluorinated polymers are used to offset raw material cost and improve material strength properties of THV. The added fluoropolymers exhibit greater mechanical toughness and thermal stability which, when blended with THV, gives a material having excellent fire resistance and thermal stability, in addition to improved mechanical strength. The mixtures (alloys) of THV and other fluoropolymers may be blended in varying concentrations according to specific applications. For protective glazing laminates, at least 85% by weight of the film must be THV to maintain transparency. As used herein, "transparent" means a haze value of less than 4% by ASTM Method D-1003, "semi-opaque" means a haze value of 4–25% and "opaque" means a haze value of greater than 25%. As defined in ASTM Method D-1003, the "light or luminous transmittance" refers to the ratio of transmitted to incident light. "Haze" is the percentage of transmitted light which deviates more than 2.5° from the incident beam by forward scattering when passing through the specimen. These values are recorded as light passes through a sample on a BYK Gardner Hazemeter.

The protective glazing laminates are useful in optical laminate applications (e.g., military and emergency vehicle windshields or glazing) where visual clarity is important and the laminates must be transparent; and, in light transmission applications (e.g., certain architechural uses) where semi-opaque characteristics are acceptable. The untrained human eye is unable to detect a haze level below 2–4%. For use in optical firescreening or safety glass for most vehicles, windows and doors, acceptable haze values are below 4.0%, preferably below 3.0%, and most preferably below 2.0%, measured in accordance with ASTM Method D-1003.

Opaque protective glazing laminates may be useful in certain structures wherein visual clarity light transmission are not desirable.

Blends of 99–85% THV with 1–15% FEP show a haze value of <4%, and thus are transparent films. As the concentration of FEP in the blend is raised to 15–50%, the films become semi-opaque, and show a haze value 4–25%. Blends of THV with ECTFE or ECCTFE, when the secondary polymer is in concentration of 1–30%, also are semi-opaque. When concentrations of FEP are raised to 50–75%, the films lose their "see-through" properties and become opaque. The opaque nature of the film yields a glass laminate having a haze value of >25%. Blends of ECTFE or ECCTFE, in concentrations of 30–70%, with THV also show film opacity as previously described.

Films containing blends of THV with >75% FEP or >70% ECTFE or ECCTFE cannot be bonded to glass in a satisfactory manner, and thus are unsuitable for glass laminates produced under industrial autoclave conditions.

Polymers of THV possess many properties which make them an outstanding candidates for firescreening interlayer films. THV exhibits exceptional flammability resistance, excellent optical clarity, a low adhesion temperature, good chemical stability, bondability to glass, low moisture absorption, low moisture sensitivity during storage and handling, high UV light stability, and excellent flexibility and elongation. The excellent flammability resistance of THV is due to the high percentage of fluorine atoms which surround the carbon backbone and form a sheath which radically decreases fragmentation of the backbone and combustion of the polymer.

The THV resins preferred in the invention include resin grade molecular weights ranging from 200,000 (THV-200G polymer, obtained from obtained from Dyneon, a joint venture of 3M Corporation and Hoechst Corp., Minneapolis, Minn.) to 500,000 (THV-500G polymer from Dyneon). The melt flow rates of these THV grades range from 5 to 25 g/10 min. @ 260° C. and 5 kg pressure, allowing for easy extrusion into films. Also preferred are THV resin grades having a polymer melting range of about 115–125° C. and comprising about 42 mole percent ECTFE, and having a polymer melting range of about 165–180° C. and comprising about 60 mole percent ECTFE.

The choice of the most preferable grade of THV depends on particular requirements for the desired applications. THV-200G possesses lower molecular weight and lower viscosity, and a higher melt flow index and elongation at break point, however, THV-500G possesses a higher melting temperature and flexural modulus. In the present invention it is acceptable that the melt flow rate for the appropriate THV grade range from 1.0 to 25.0, preferably from 3.0 to 20.0 and most preferably from 5.0 to 10. Due to the relatively high softening temperature ranges of the THV polymers, crosslinking treatment typically required to extend the softening range is not necessary. This allows for better film consistency and higher optical quality.

The ECTFE and ECCTFE polymers suitable for use herein are available from Ausimont Corporation (Italy) under the Halar trade name. Other fluoropolymers used herein may be obtained from Daikin (Japan) and Dupont (USA).

The interlayer films preferably comprises an additive package containing coupling agents (0.1 to 2.0%, by weight). The interlayer films may contain silane coupling agents (0.3–2.0%, by weight) to improve adhesion of the interlayer film to glass. An adhesive primer coating on the glass or plastic glazing also may be used. A preferred coupling agent for use with THV is vinyl triethoxy silane (VTES). Silane coupling agents do not improve the adhesion of the interlayer films to glass in concentrations below 0.3%, by weight. Silane coupling agent concentrations of greater than 2.0%, by weight, increase the haze of the final material. The preferred range of the coupling agent is 0.5% to approximately 1.7%, by weight, and the most preferred range of the coupling agent is from 0.7% to approximately 1.5%, by weight of film.

Other additives, such as pigments, coloring agents, or concentrates and IR- or UV-light blockers, can be incorporated to achieve special properties in the protective glazing and/or plastic laminates.

Unlike PVB and methacrylate-based films which have been used in previous firescreening laminates, THV-based films, as described by the present invention, do not need plasticizers due to the high impact, notch and tear resistance characteristics of the THV resin. In addition, the THV-based films described in this invention do not require additives to increase fire resistance as seen in previous firescreening applications, due to the high flammability resistance of THV films For the reinforcement layer, a glass fiber mesh may be incorporated between layers of the THV or THV-based film to add structural support. Such reinforcement is an improvement over the metallic mesh known for use in interlayer films, e.g., U.S. Pat. No. 4,978,405. The metallic mesh adds considerable weight to the final laminated glass product and detracts from the aesthetic and optical properties of the laminate. Addition of a glass fiber mesh does not add appreciably to the weight of the final product. Due to the white color and relatively translucent appearance of fiber glass mesh compared to metallic mesh, the fiber glass mesh preserves more of the optical qualities of the laminate. The glass fiber mesh is preferably imbedded between layers of the film, which allows the THV or THV-based blend to retain its high bondability to glass. The extra structural support allows thinner films to be used for particular applications, reducing both waste and cost. Suitable glass fiber mesh is available from Bay Mills Limited, Bayex Division, Ontario, Canada, and Carl Freudenberg, Technical Nonwovens, Weinheim, Germany.

Other reinforcement layers useful herein include, but are not limited to, fluoropolymer fiber mesh, Spectra (polyethyleneterephthalate) fiber mesh, and, in applications where appropriate, metallic fiber mesh. The mesh may be in the form of woven, nonwoven, knitted and hybrid mesh. Also useful are perforated sheets of the reinforcing materials, sized to permit the sheet to be embedded within the interlayer film during assembly of the laminate. The reinforcement layer is preferrably 0.025 to 0.51 mm in thickness.

Light transparency and haze of the interlayer film and glass laminate depend, in part, on the thickness of the interlayer film. The minimum thickness of the interlayer will be a function of the safety requirements for the selected application. For the transparent protective glazing laminates used in vehicular glazing and architectural glass, the fluoropolymer interlayer films preferably have a thickness of 0.125 to 1.0 mm (5 to 40 mil). The preferred thickness is determined by impact and penetration resistance testing and the ability of the laminate to retain glass debris upon breaking. A high impact resistance interlayer film and reinforcement layer permits a reduction in the thickness of the films needed to meet a specified safety requirement. As an added benefit of the invention, the reduced film thicknesses possible when using these fluoropolymer interlayers also decreases the haze value for the protective glazing laminate.

To manufacture the interlayer films of the invention, the polymers may be blended with the coupling agent and other additives in a high speed dry mixer and compounded using a melt compounding extruder. Twin screw co-rotating extruder Model ZSK-30 with 30 mm screws made by Werner Pfleiderer Corporation was utilized in the present invention, but any other suitable compounding extruder can be used. The compounding machine should provide a uniform mixing of the basic thermoplastic resins, with relatively small quantities of required additives.

In a preferred method of producing the films useful in the invention, a melt exiting the extruder is formed into strings using a die plate with a number of holes, e.g. 4–6 holes for a relatively small die plate, which may be fitted with a screen filter to remove any gels and impurities from the melt. The strings may be cooled in a water bath; cut into pellets of standard size (1–4 mm in diameter, and 2.5–5 mm in length); and dried. The pelletized formulations may be stored and extruded into a film as needed.

In a suitable process, film extrusion lines are equipped with flat extrusion dies and casting rolls or drums used to calibrate the thickness and to cool the film web. After cooling, the film is wound into rolls. The thickness and the width of the interlayer film will depend on the particular application, with the thickness typically varying in the range from about 125 mcm (5 mil) to 1000 mcm (40 mil).

The interlayer film according to the present invention can be laminated to mineral glass or polymeric substrates using the same technologies and conditions being used for conventional PVB protective and safety glazing interlayer films. Good quality mineral glass laminates can be manufactured in an autoclave under a vacuum at temperatures in the range from 100 to 200° C., preferably 140° C. to 170° C., and pressures in the range of 12 bar to 23 bar. Preferred autoclave lamination conditions include temperatures in the range from 150° C. to 165° C. and pressures in the range from 13 bar to 17 bar.

In a typical process using mineral glass, the interlayer film is placed between glass plates and trimmed to the appropriate size. The glass/film/glass sandwich is sealed in a vacuum bag and a vacuum is applied to the bag until all air is removed. The vacuum bag containing the sandwich is placed in the autoclave and processed as described above.

Useful glass or polymeric substrates for lamination to the films of the invention include all glazing materials known in the art of protective or safety glazing. Preferred laminating substrates include fire or impact resistant substrates, including, but not limited to, borosilicate glasses, soda-lime glasses, tempered mineral glasses, polycarbonate, polyacrylate, and combinations thereof. Surface treatments of the laminating substrates as are known in the art for abrasion resistance, heat reflectance, and the like, may be added. The laminating substrates may be reinforced with wire mesh, or other reinforcing materials.

To improve adhesion of the films to mineral glass, a solution (e.g., 0.5–10 Wt. %) of an siloxane primer (e.g., amino tripropyl siloxane) in water or a water/alcohol (e.g., isopropanol) mixture is preferably used to coat the contact surfaces prior to autoclave lamination. Application may be by dipping, spraying or brushing, followed by drying immediately or after holding for 2–5 minutes at 120–180° C. For optimum adhesion, a monomolecular layer of silane is applied and the quantity per area of surface varies according to the chemistry and surface area of the substrate and interlayer and the wetting characteristics of the silane used.

The formula:

$$g\ silane = \frac{g\ substrate \times specific\ surface\ area\ of\ substrate\ in\ m2/g}{specific\ wetting\ area\ of\ the\ silane\ in\ m2/g}$$

may be used to calculate the optimum amount of silane coating needed to adhere the interlayer to the substrate.

EXAMPLES

The following examples are specific illustration of embodiments of the invention. These examples illustrate the invention and are not intended to limit the scope of the invention.

Processing Formulations of THV and THV/Fluoropolymer Blends into Films

Process #1

Formulations based on THV and THV/FEP polymers were produced by mixing their melts with a coupling agent using a twin-screw extruder ZSK-30 made by "Werner Pfleiderer Co." of Ramsey, USA, equipped with two co-rotating screws with a diameter of 30 mm. All formulations were premixed in a dry high speed (turbo) mixer at 300 rpm for 20 min. and then fed into the twin-screw extruder. Extruder ZSK-30 was equipped with a screen filter followed by a die plate having four holes. All formulations were extruded into strings. The strings were cooled in a water bath and then cut into pellets of 2.5–3 mm in diameter and 3–4 mm in length. For formulations of THV, the twin-screw extruder had the following temperatures at the barrel: feeding zone #1—100–115° C., barrel zone #2—145–155° C., barrel zone #3—170–180° C., barrel zone #4—190–200° C., barrel zone #5—200–210° C., die plate—205–225° C. The speed of the screws was 96 rpm. The pellets were pre-dried at 75–80° C.

Process #2

For formulations of THV/FEP blends, the twin-screw extruder had the following temperatures at the barrel: feeding zone #1—210–225° C., barrel zone #2—255–270° C., barrel zone #3—285–300° C., barrel zone #4—290–305° C., barrel zone #5— 300–315° C., die plate—300–315° C. The speed of the screws was 70 rpm. The pellets were dried using a room temperature air stream.

Process #3

For formulations of THV/ECTFE and THV/ECCTFE blends, the twin-screw extruder had the following temperatures at the barrel: feeding zone #1—170–185° C., barrel zone #2—205–215° C., barrel zone #3—225–240° C., barrel zone #4—230–245° C., barrel zone #5—235–250° C., die plate—245–260° C. The speed of the screws was 75 rpm. The pellets were dried using a room temperature air stream.

In extrusion process #1, the extruded pellets were processed into films using a cast film line consisting of a single screw extruder made by Extrusion Systems Limited (ESL), United Kingdom. The screw of the ESL extruder had a diameter of 32 mm and a relative screw length of 24 diameters. The extruder was equipped with a flat extrusion die having an orifice which was approximately 32 cm (13 inches) wide. Films of two thicknesses, 0.13 mm (5 mil) and 0.18 mm (7 mil), were produced from the formulations. The barrel of the single screw film extruder was divided into four heating zones, progressively increasing the temperature of the polymer material up to the adapter, filter, and the flat die. For pure THV-200G films, the barrel temperature was maintained in each of the zones 1–4 in the range 100–110° C., 140–155° C., 165–180° C. and 180–190° C. respectively. The temperature of the adapter was maintained approximately at 190–195° C. The temperature of the die was maintained approximately at 190–200° C. in the middle sections, at 190–200° C. at both edges of the die, and at 195–205° C. at the lips of the die. For THV-500G blends, the barrel temperature was maintained in each of the zones 1–4 in the range 185–195° C., 235–240° C., 255–265° C., 260–270° C. respectively. The temperature of the adapter was maintained approximately at 250–260° C. The temperature of the die was maintained approximately at 230–240° C. in the middle sections, at 240–250° C. at both edges of the die, and at 245–255° C. at the lips of the die.

Blends of THV/FEP required a much higher extrusion temperature. The barrel temperatures for THV/FEP blends were maintained in each of the zones 1–4 in the ranges of 215–225° C., 250–265° C., 270–280° C., 285–295° C. respectively. The temperature of the adapter was maintained approximately at 285–290° C. The temperature of the die was maintained approximately at 290–295° C. in the middle of the die and 295–300° C. at the edges and lips of the die. Blends of THV/ECTFE and THV/ECCTFE required slightly lower temperatures than the THV/FEP blends, but still higher temperatures than pure THV. The barrel temperatures for the THV/ECTFE and THV/ECCTFE blends were maintained in each of the zones 1–4 in the ranges of 205–215° C., 225–235° C., 230–240° C., 230–240° C. respectively. The temperature of the adapter was maintained approximately at 225–230° C. The temperature of the die was maintained approximately at 230–235° C. at the middle of the die, and 235–240° C. at the edges and lips of the die.

The temperatures were varied in each zone in a relatively narrow range according to the melt flow rate of the resin used. The speed of the screw was maintained at between 23.0 rpm for 0.13 mm thick films and 23.3 rpm for 0.18 mm thick films. Each film was extruded and cooled using a 3 roll casting roll stock and was wound onto 7.6 cm (3") cores.

In extrusion process #2, the extruded pellets were processed into films using a cast film line based on a single screw extruder made by Davis-Standard. The screw of the Davis-Standard extruder had a diameter of 51 mm and a relative screw length of 24 diameters. The extruder was equipped with a flat extrusion die having an orifice which was approximately 140 cm (55 inches) wide. Films of THV-200G in three thicknesses, 0.18 mm (7 mil), 0.25 mm (10 mil), and 0.36 mm (14 mil), were made. The barrel of the single screw film extruder was divided into four heating zones, progressively increasing the temperature of the polymer material up to the adapter, filter, and the flat die. The barrel temperature was maintained in each of the zones 1–4 in the range 110–125° C., 155–170° C., 180–200° C. and 190–210° C. respectively. The temperature of the adapter was maintained approximately at 195–205° C. The temperature of the die was maintained approximately at 190–200° C. in the middle sections, at 195–205° C. at the both edges of the die, and at 195–200° C. at the lips of the die.

The temperatures were varied in each zone in a relatively narrow range according to the melt flow rate of the resin used. The speed of the screw was maintained at approximately 25.0 rpm for all films. Each film was extruded and cooled using a 3 roll casting roll stock and was wound onto 7.6 cm cores.

Lamination of Firescreening Film between Glass

Laminated mineral glass samples were prepared using clear soda-lime-silicate glass sheets of 3 mm thickness and dimensions of 7.5×7.5 cm which were cleaned using isopropyl alcohol to remove dust, grease and other contaminates from the glass surface.

For lamination, a piece of film was cut to obtain a sample which was 7.5×7.5 cm. This film sample was placed between two cleaned glass plates and then the entire glass sandwich was placed in a laboratory press, Model 3891, manufactured by Carver, Inc., Wabash, Ind., equipped with a temperature-pressure-time control system monitored by a microprocessor. A program of heat and pressure was used to simulated autoclave conditions typical of optical laminate manufacture. The heating melted the film surfaces during the lamination process, helping to adhere the polymer film to the glass substrate. For some tests, a set of full sized glass laminate (100 cm×100 cm) was produced using an industrial autoclave set at 140° C. and 12 bars of pressure under vacuum.

Glass Laminate Testing Procedures

Laminate samples produced according to the above description were tested for light transmittance, haze, impact and firescreening properties. Haze values of the laminates were measured using a Haze Gard® Plus hazemeter obtained from BYK Gardener Corporation (USA, Germany) as indicated in ASTM Method D-1003. Light transmittance was measured using ANSI standard Z26.1 T2 and haze for Examples 1 and 2 was measured using ANSI standard Z26.1 T18.

Impact properties of the laminates were measured using the following standard tests: Impactor test—CEN/TC129/WG13/N42; Ball drop test—DIN 52338; Ball drop test—ECE R43 A6/4.2; and Ball drop test—NF P 78406. Fire resistance was measured using ISO standard 834 test. According to this standard, firescreening glass must past 30 minutes of fire testing.

Example 1

Films of differing thicknesses of THV-200G resin, obtained from 3M Corporation and containing 0.7–1.5 wt. % VTES coupling agent, obtained from OSI Specialty Chemicals, West Virginia, were extruded using Process #2 and tested to identify optimal thickness for safety and performance. Acceptable ball drop safety test results and fire resistance test results were obtained from a film thickness of at least 0.25 mm (10 mil). This compares favorably to commercial interlayer films of PVB for safety glass laminates which are usually at least 0.76 mm (28 mil) in thickness. Haze values for the THV films are set forth in Table 1. The haze of the THV film was <4%, well within the requirements for transparent optical laminates.

TABLE 1

Laminates of Films Made with THV-200G Resin

| Thickness (mil) mm | Ball Drop Test (a) | Fire Resistance Test (b) |
|---|---|---|
| 0.125(5) | Fail | Fail |
|  | Fail |  |
|  | Fail |  |
| 0.188(7.5) | Pass | Fail |
|  | Pass |  |
|  | Fail |  |
| 0.250(10) | Pass | Fail |
|  | Pass |  |
|  | Pass |  |
| 0.350(14) | Pass | Pass |
|  | Pass |  |
|  | Pass |  |
| 0.750(30) | Pass | Pass |
|  | Pass |  |
|  | Pass |  |

(a) — Three (3) repetitions of the Ball Drop Test were conducted. A Pass was given if the weight did not penetrate both glass plates in the laminate (penetration of one glass plate was acceptable).
The Ball Drop test entails dropping a ball weight from a certain height onto a laminate which is placed on a pedestal.
The following weights/heights are used:
1. 1.03 kg/6.0 meters
2. 2.26 kg/4.0 meters
4. 4.10 kg/1.5 meters
(b) — A pass was given in the Firescreening test, if the laminate withstood ≧30 minutes in a fire situation.

Example 2

Films of differing thicknesses of THV-500G resin, obtained from 3M Corporation and containing 0.7–1.5 wt. % VTES coupling agent, obtained from OSI Specialty Chemicals, West Virginia, were extruded using Process #1 to identify optimal thickness for safety and cost. Ball drop impact test results and fire resistance test results for the THV film were acceptable at an interlayer film thickness of less than 0.25 mm (10 mil). The THV-500G films possessed better mechanical properties but identical fire resistance properties to the THV-200G films. Haze values of the films were less than 4%.

Light transmission of the THV-200G sample (0.18 mm film) was 86.4%; and of the THV-500G sample (0.18 mm film) was 87.2%. Shock Resistance/Ball Drop Tests carried out on THV-200G samples (50 kg bag dropped from 1.2 meter) onto a 0.18 mm (7 mil) film and a 0.24 mm (9.5 mil) film demonstrated acceptable film strength at both thicknesses. A 26 kg marble dropped from varying heights onto a 0.18 mm (7 mil) film broke through at 3 meters and at 4 meters for a 0.24 mm (9.5 mil) film.

Example 3

Mixtures of THV-200G and FEP (FEP grade NP-20 obtained from Daikin Corporation, Japan) were made into films using Process #2 and examined to determine the optimal concentration of FEP to give increased mechanical strength, but minimize film haze. When the concentration of FEP in the blend was increased above 15%, the optical light transmittance decreased below 75% and the haze of the blended film rose above 4%. Blends where the concentration of FEP was 1–15% of the total mixture yielded films with a haze value less than or equal to 4%, allowing them to be used as transparent optical laminates. Test results are shown in Table 2.

Example 4

Blends of THV/FEP containing 15–50% FEP (NP-20 from Daikin Corporation, Japan) and extruded using Process #2 yielded films which were semi-opaque. These films displayed haze values of 4–25%. Although the haze made these films unsuitable for transparent laminates, interlayer film fire resistance and mechanical properties were acceptable. Test results are shown in Table 2.

Example 5

Blends of THV/FEP containing 50–75% FEP (NP-20 from Daikin Corporation, Japan) and extruded using Process #2 yielded films which showed no optical transparency and were opaque. The interlayer films displayed haze values >25%. Although the haze made these films unsuitable for optical laminates, the interlayer film fire resistance and mechanical properties were acceptable. Test results are shown in Table 2.

In the absence of a coupling agent, THV blends where FEP concentration was >75% did not bond adequately to substrates under standard autoclaving conditions.

TABLE 2

Blends Concentrations and Haze values
THV/FEP Blends

| THV Concentration (%) | FEP Concentration (%) | Haze (%) |
|---|---|---|
| 100 | 0 | ≦1 |
| 95 | 5 | 1.5–2 |
| 90 | 10 | ≦4 |
| 85 | 15 | 4–7 |
| 70 | 30 | 14–17 |
| 65 | 35 | 19–23 |
| 60 | 40 | 25–30 |
| 50 | 50 | 35–50 |
| <50 | >50 | >50 |

Haze was measured using the ASTM D-1003 method.

Example 6

Blends of THV/ECTFE containing 1–30% ECTFE (Halar 300 resin obtained from Ausimont Corporation, Italy) and extruded using Process #3 yielded films which were semi-opaque. The films displayed haze values of 4–25%. Although these films were unsuitable for transparent laminates due to haze, fire resistance and mechanical properties of the films were acceptable. Test results are shown in Table 3.

Example 7

Blends of THV/ECTFE containing 30–70% ECTFE (Halar 300 resin obtained from Ausimont Corporation, Italy) and extruded using Process #3 yielded films which showed no optical transparency, and were opaque. The films displayed haze values of >25. Although these films were unsuitable for use as optical laminates due to haze, fire resistance and mechanical properties of the film were acceptable. Test results are shown in Table 3.

Example 8

Blends of THV/ECCTFE containing 1–30% ECCTFE (Halar 353 resin obtained from Ausimont Corporation, Italy) and extruded using Process #3 yielded films which showed some optical transparency, and were semi-opaque. The films displayed haze values of 4–25%. Although these films were unsuitable for optical laminates due to haze, fire resistance and mechanical properties of the films were acceptable. Test results are shown in Table 3.

Example 9

Blends of THV/ECCTFE containing 30–70% ECCTFE (Halar 353 resin from Ausimont Corporation, Italy) yielded films which showed no optical transparency, and were opaque. The films displayed haze values greater than or equal to >25%. Although these films were unsuitable for use as optical laminates due to haze, fire resistance and mechanical properties of the film were acceptable. Test results are shown in Table 3.

TABLE 3

THV/ECTFE and THV/ECCTFE Blends

| THV Conc. (%) | ECTFE Conc. (%) | ECCTFE Conc. (%) | Haze (%) |
|---|---|---|---|
| 90 | 10 |  | 10–15 |
| 50 | 50 |  | 25–30 |
| 10 | 90 |  | 42–51 ($\geq$) |
| 90 |  | 10 | 12–19 |
| 50 |  | 50 | 30–37 |
| 10 |  | 90 | 46–52 ($\geq$) |

Example 10

Coupling agents were used to increase the bondability of the THV and THV/FEP films to a lamina without pre-treatment of the surface of the lamina with primers. Several formulations were prepared using THV-200G (3M Corporation) with coupling agents, vinyl triethyoxysilane (VTES) or aminopropyl triethoxysilane (APTES), both obtained from OSI Specialty Chemicals, West Virginia. Films were prepared by Process #1 and the film components were mechanically tumbled for one hour prior to extrusion to insure a uniform mixture. One of the films was treated with the corona discharge treatment described below in Example 13. Evaluation of these films showed that incorporation of APTES into the fluorinated resin yielded films that were of a yellow color and hue. Incorporation of VTES into the films yielded films that were colorless. The haze test results for the unblended THV-200G samples are shown in Table 4.

TABLE 4

| Concentration of VTES (%) | Haze (%) |
|---|---|
| 0.0 | 1.4 |
| 0.3 | 1.4 |
| 0.5 | 1.8 |
| 0.7 | 2.5 |
| 1.0 | 4.5 |
| 1.5 | 7.5 |
| 2.0 | 10.5 |
| 0.7 + corona | 0.91 |

The corona treated sample was prepared as described above and treated as described in Example 13. Light transmission of the laminate containing the corona treated sample was 89.65%.

Example 11

To increase structural stability without increasing film thickness, glass laminates containing THV-200G and glass fiber and polyester fiber reinforcement were produced. Fiberglass and polyester meshes samples of differing mesh and strand size were obtained from Bay Mills Limited, Bayex Division (Ontario, Canada). Fiberglass nonwoven samples were obtained from Carl Freudenberg, Technical Nonwovens (Weinheim, Germany). The glass fiber mesh or nonwoven matt material was placed between two 0.125 mm (5 mil) layers of THV-200G film, allowing for a finished film thickness of about 0.25 mm (10 mil). This film/fiber/film sandwich was heated to 200° C. and compressed between sheets of tetrafluoroethylene in a Carver Laboratory Press at about 1,000 psi (70.31 Kg/sq cm) for 30 minutes to form a single unit, which was then laminated between two glass plates as described above. The luminous transmission of the laminates was measured as described above and the results are shown below in Table 5. The reinforcement within the final laminate permitted better structural support and thinner film requirements (to meet impact test requirements) without significant loss of luminous transmission.

TABLE 5

| Reinforcement | Luminous Transmission |
|---|---|
| Fiberglass/Polyester Meshes | |
| GF 6610/A - Crosshatch Fiberglass | 66–67% |
| QX 3211/F14 - Crosshatch Polyester | 78–81% |
| TGCD 2320/K10 - Tri-directional non-woven scrim | 80–84% |
| GC1111 A - Crosshatch Fiberglass | 83–86% |
| Fiberglass Nonwoven Mat | |
| T-1785/E-Glass | 83–85% |

Example 12

To increase structural stability without increasing film thickness, glass laminates containing THV-200G, 0.7–1.5 wt. % VTES coupling agent and metallic meshes were produced. Alumninum screening mesh was obtained from BayMills Limited. Other metallic mesh, including brass, copper and bronze meshes, in a variety of mesh and wire sizes were obtained from Delker Corporation (USA). The metallic mesh was placed between two 0.125 mm (5 mil) layers of THV-200G, allowing for a final film thickness of about 0.25 mm (10 mil). This film/fiber/film sandwich was heated and compressed to form a single unit as described in Example 12, which was then laminated between two glass plates using laminating conditions previously described. As with the glass fiber reinforcement, the metallic mesh within the final laminate permitted better structural support and a thinner film was adequate to meet interlayer requirements for impact tests.

Example 13

Films of THV-200G resin obtained from 3M Corporation were extruded using Process #2 to a thickness of 0.38 mm (15 mil) and exposed to a corona discharge in a acetone/nitrogen atmosphere to increase adhesion of the fluoropolymer film to the glass substrate. The corona discharge treatment procedure as provided in U.S. Pat. No. 3,676,181 (Kowalewski) was used to treat the film. The atmosphere of the enclosed treatment equipment was 20%, by volume, acetone in nitrogen and flow of gas was continuous. The THV-200G film was continuously fed into the enclosure and subjected to between 0.045 and 0.76 watts/hours/square meter (0.15 and 2.5 watt hours per square foot) of the film surface. The visual clarity of the film did not change as a result of the corona treatment.

In the absence of corona treatment, fluoropolymer film laminated onto soda lime glass exhibited a blistering phenomenon where the film did not completely adhere to the glass substrate in many areas. Pummel tests of the non-corona treated laminate (conducted as described in U.S. Pat. No. 4,952,460 to Beckmann, et al) showed pummel ratings of 0, where no glass remained on the film after impact. The corona discharge treatment increased the adhesion of the film to glass to yield a laminate which exhibited an acceptable lamination pattern and pummel test ratings of 1–2, in which 5–10% of the glass remained bonded to the film after impact.

Example 14

Film of THV-500G resin, obtained from 3M Corporation, were extruded into a 0.38 mm (15 mil) thickness using Process #2 and exposed to a corona discharge in an acetone/nitrogen atmosphere as described in Example 13 prior to lamination of the fluoropolymer film to a glass substrate.

In laminations of THV-500G film to soda lime glass, the laminate exhibited an almost complete delamination of film to glass substrate. As with the THV-200G non-corona treated samples, the laminates exhibited a pummel rating of 0. Exposure of the THV-500G film to a corona discharge was found to increase the adhesion of the film to glass to yield a laminate with a decreased blistering effect. The adhesion of the corona-treated THV-500G film showed adhesion pummel ratings of 0–1, with 0–5% glass remaining after impact.

Example 15

Formulations of THV-200G and THV-500G with a silane coupling agent (VTES) in concentrations of 0.7–1.5% by weight were extruded using Process #2 and exposed to the corona discharge as previously described in Example 13.

In the absence of a corona treatment, laminates exhibited inadequate adhesion for testing, showing blistering and severe delamination. Laminates containing THV-200G/VTES film which was treated with corona discharge exhibited little or no visual blistering or delamination, even over extended time periods. These corona treated THV-200G/VTES laminates exhibited a pummel value of 4–5, where up to 50% of the glass remained on the laminate after impact. Laminates containing corona treated THV-500G/VTES exhibited pummel values of 1–3, where 5–15% of the glass remained on the surface of the laminate. An increase in silane content in THV-200G up to 1.0% increased the pummel values up to a rating of 4–5.

We claim:

1. A protective glazing laminate comprising at least two protective glazing layers, at least one fluoropolymer interlayer, comprising at least 85 Wt % tetrafluoroethylene/hexafluoropropylene/vinylidene fluoride copolymer, and at least one reinforcement layer embedded in the fluoropolymer interlayer.

2. The protective glazing laminate of claim 1, wherein the protective glazing layers are selected from the group consisting of polycarbonates, soda glass, crystallized glass, borosilicate glass, keraglass, acrylics, and combinations thereof.

3. The protective glazing laminate of claim 1, wherein the fluoropolymer layer further comprises at least one fluoropolymer selected from the group consisting of FEP, PFA, PCTFE, ETFE, PVDF, ECTFE and ECCTFE, and combinations thereof.

4. The protective glazing laminate of claim 1, wherein the reinforcement layer is selected from the group consisting of glass fiber mesh, spectra fiber mesh, fluoropolymer fiber mesh, thermoplastic mesh comprising fire retardant, and metallic fiber mesh, and combinations thereof.

5. The protective glazing laminate of claim 4, wherein the reinforcement layer is selected from the group consisting of woven, nonwoven, knitted, and hybrid meshes.

6. The protective glazing laminate of claim 1, wherein the reinforcement layer is transparent.

7. The protective glazing laminate of claim 1, wherein the laminate is characterized by a maximum of 4% haze.

8. The protective glazing laminate of claim 1, wherein the fluoropolymer layer is a laminate of two fluoropolymer film layers having an interlayer consisting of the reinforcing mesh.

9. The protective glazing laminate of claim 8, wherein the fluoropolymer layer is less than 0.51 mm (20 mil) thick.

10. The protective glazing laminate of claim 1, wherein the protective glazing is glass.

11. The protective glazing laminate of claim 1, wherein the laminate is a firescreen having sufficient thermal resistance to meet the fire protection standards of ISO 834.

12. The protective glazing laminate of claim 11, wherein the firescreen comprises at least two layers of protective glazing, each about 2 to 10 mm in thickness, and an fluoropolymer interlayer of 85–100 Wt % THV and 0 to 15 Wt % of a polymer selected from the group consisting of FEP, PFA, PCTFE, ETFE, PVDF, ECTFE and ECCTFE, and combinations thereof, and a glass fiber reinforcing mesh, the fluoropolymer interlayer having a thickness of about 5 to 25 mm.

13. The protective glazing laminate of claim 1, wherein the laminate is an impact resistant glazing having sufficient impact resistance to meet the protection standards of Din 52338.

14. The protective glazing laminate of claim 13, wherein the impact resistant glazing comprises at least two layers of protective glazing, each about 2 to 10 mm in thickness, and an fluoropolymer interlayer of 85–100 Wt % THV and 0 to 15 Wt % of a polymer selected from the group consisting of FEP, PFA, PCTFE, ETFE, PVDF, ECTFE and ECCTFE, and combinations thereof, and a glass fiber reinforcing mesh, the fluoropolymer interlayer having a thickness of about 5 to 25 mm.

15. The protective glazing laminate of claim 1, wherein the fluoropolymer layer further comprises at least one additive selected from the group consisting of coupling agents, pigments, IR blocker, UV blocker and combinations thereof.

16. The protective glazing laminate of claim 15, wherein the fluoropolymer layer comprises at least one silane coupling agent.

17. The protective glazing laminate of claim 16, wherein the fluoropolymer layer comprises vinyltriethoxysilane.

* * * * *